(12) United States Patent
Takamoto et al.

(10) Patent No.: US 11,091,058 B2
(45) Date of Patent: Aug. 17, 2021

(54) FUEL CELL SYSTEM

(71) Applicant: HONDA MOTOR CO., LTD., Tokyo (JP)

(72) Inventors: Shingo Takamoto, Wako (JP); Akio Futatsudera, Wako (JP); Akihiro Matsui, Wako (JP); Kuniaki Ojima, Wako (JP); Takuto Nakagawa, Wako (JP); Takuya Shirasaka, Wako (JP); Kosuke Higashitani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 367 days.

(21) Appl. No.: 16/273,283

(22) Filed: Feb. 12, 2019

(65) Prior Publication Data

US 2019/0255969 A1 Aug. 22, 2019

(30) Foreign Application Priority Data

Feb. 16, 2018 (JP) .............................. JP2018-025879

(51) Int. Cl.
| | |
|---|---|
| *B60L 58/30* | (2019.01) |
| *B60L 58/40* | (2019.01) |
| *H01M 10/44* | (2006.01) |
| *H01M 8/04537* | (2016.01) |
| *H01M 8/04828* | (2016.01) |

(52) U.S. Cl.
CPC .............. *B60L 58/30* (2019.02); *B60L 58/40* (2019.02); *H01M 8/0494* (2013.01); *H01M 8/04619* (2013.01); *H01M 10/44* (2013.01); *H01M 2250/20* (2013.01); *H02J 2300/30* (2020.01)

(58) Field of Classification Search
CPC .. H01M 8/04619; H01M 16/006; B60L 58/40
See application file for complete search history.

(56) References Cited

U.S. PATENT DOCUMENTS

2017/0072813 A1* 3/2017 Martin ................ H01M 10/486

FOREIGN PATENT DOCUMENTS

| JP | 2017-152280 | | 8/2017 |
|---|---|---|---|
| JP | 2017152280 | A * | 8/2017 |

* cited by examiner

*Primary Examiner* — Stephan J Essex
(74) *Attorney, Agent, or Firm* — Amin, Turocy & Watson, LLP (57) ABSTRACT

A fuel cell system includes a FC, a TRC, an oxygen-containing gas supply apparatus, a battery, and an ECU. The ECU is capable of performing power consumption control which allows the oxygen-containing gas supply apparatus to consume electrical energy during regeneration of the TRC. The ECU is configured to determine a charge margin with respect to a charge limitation value of the battery, in a manner that the charge margin set after the power consumption control starts becomes smaller than the charge margin set before the power consumption control is performed.

4 Claims, 8 Drawing Sheets

FUEL CELL SYSTEM

CROSS-REFERENCE TO RELATED APPLICATION

This application is based upon and claims the benefit of priority from Japanese Patent Application No. 2018-025879 filed on Feb. 16, 2018, the contents of which are incorporated herein by reference.

BACKGROUND OF THE INVENTION

Field of the Invention

In structure including a fuel cell, an electric motor, and a battery, the present invention relates to a fuel cell system for controlling the charging state of the battery.

Description of the Related Art

As disclosed in Japanese Laid-Open Patent Publication No. 2017-152280, in a fuel cell system, a battery (energy storage) is connected in parallel between a fuel cell and a motor (electric motor), and the battery is charged with electrical energy generated by the fuel cell and regenerative electrical energy generated by the motor. When generated electrical energy is not sufficient, the battery supplies electrical energy. Further, auxiliary devices such as an air pump are connected in parallel between the fuel cell and the battery. Electrical energy from the fuel cell is supplied to the auxiliary devices. When generated electrical energy is not sufficient, electrical energy is supplied from the battery to the auxiliary devices.

In this type of the fuel cell system, in order to handle transitive variation of electrical energy consumed by the auxiliary devices, margins (charge margin, discharge margin) are set before limit values in a charge/discharge limitation range of the battery. For example, using the charge margin, the battery absorbs transitive variation of electrical energy consumed by the air pump (unsteady changes in electrical energy actually used by the air pump in contrast with estimated electrical energy consumed by the air pump during steady operation). In this manner, even if regenerative electrical energy is supplied from the air pump, it is possible to protect the battery from the overcharging state.

SUMMARY OF THE INVENTION

In the fuel cell system of this type, at the time of regenerating electrical energy at the motor, power consumption control is performed for consuming redundant electrical energy which cannot be stored in the battery. In the power consumption control, for example, rotation speed of the air pump is increased to increase the quantity of consumed electrical energy (power consumption quantity).

In this regard, in the power consumption control, in the case where the charge margins have been set for the battery as described above, though the limit values of the charge/discharge limitation range have not yet been reached, electrical energy generated during regeneration is supplied to and consumed by the air pump. That is, electrical energy is consumed more than required for the power consumption control. As a result, fuel economy is degraded, unwanted noises are generated, and overheating of the air pump occurs undesirably.

The present invention has been made to solve the above problem, and an object of the present invention is to provide a fuel cell system in which a margin is changed in correspondence with the state change of control to protect a battery from the overcharging state with the minimum necessary power consumption during regeneration of electrical energy by an electrical motor.

In order to achieve the above object, the fuel cell system according to the present invention includes a fuel cell, an electric motor configured to be rotatably driven when electrical energy is supplied to the electric motor, and configured to regenerate electrical energy as a consequence of rotation, an oxygen-containing gas supply apparatus configured to supply an oxygen-containing gas to the fuel cell, a chargeable and dischargeable energy storage connected electrically to the fuel cell, the electric motor, and the oxygen-containing gas supply apparatus, and a control unit configured to perform power consumption control for controlling allocation of electrical energy for the electric motor, the oxygen-containing gas supply apparatus, and the energy storage, and allowing the oxygen-containing gas supply apparatus to consume electrical energy generated during regeneration of the electric motor. The control unit is configured to determine a charge margin for a charge limitation value of the energy storage in a manner that the charge margin after starting the power consumption control is smaller than the charge margin before performing the power consumption control.

In the above fuel cell system, with the simple structure where the charge margin after starting the power consumption control is smaller than the charge margin before performing the power consumption control, it is possible to protect the battery from the overcharging state during regeneration of the electric motor. Further, electrical energy consumed in the oxygen-containing gas supply apparatus during the power consumption control is reduced. In this manner, it becomes possible to suppress overheating of the oxygen-containing gas supply apparatus. That is, it is possible to effectively utilize the electrical energy in the entire fuel cell system, and realize stable driving of the system.

Further, preferably, during the state change where electrical energy during regeneration of the fuel cell system changes in the power consumption control, the control unit is configured to make the charge margin become larger than the charge margin after starting the power consumption control.

In the fuel cell system, at the time of the state change where electrical energy during regeneration of the system changes the charge margin is changed to become larger than the charge margin after starting the power consumption control. In this manner, transitive variation in the consumed electrical energy for reducing the number of rotations of the air pump is absorbed.

Further, the control unit should be configured to determine that a power width in correspondence with steady operation of the oxygen-containing gas supply apparatus is the charge margin after starting the power consumption control, and the control unit should be configured to change the charge margin during the state change to become a power width in correspondence with the responsiveness during transitive operation where the drive state of the oxygen-containing gas supply apparatus changes when the power consumption control is not performed.

In the fuel cell system, the power width in correspondence with the steady operation of the oxygen-containing gas supply apparatus is determined as the charge margin. In this manner, it becomes possible to sufficiently reduce the charge margin. Further, change of electrical energy consumed in steady operation of the oxygen-containing gas supply apparatus becomes acceptable. Further, during the state change, the charge margin is changed to the power width in correspondence with the responsiveness at the time of transitive operation where the driving state of the oxygen-containing gas supply apparatus changes. In this manner, it is possible to achieve both of protection of the energy storage from the overcharging state, and suppress overheating of the oxygen-containing gas supply apparatus in the optimum state.

Moreover, the fuel cell system can be mounted in a fuel cell vehicle.

In the fuel cell system mounted in the fuel cell vehicle, it is possible to increase the efficiency in the use of electrical energy at the time of driving the fuel cell vehicle.

In the present invention, the fuel cell system changes the margin in correspondence with the state change of control. In this manner, it is possible to protect the battery from the overcharging state during regeneration of the electrical energy of the electric motor.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of the present invention will be described with reference to the accompanying drawings.

Figure 1:
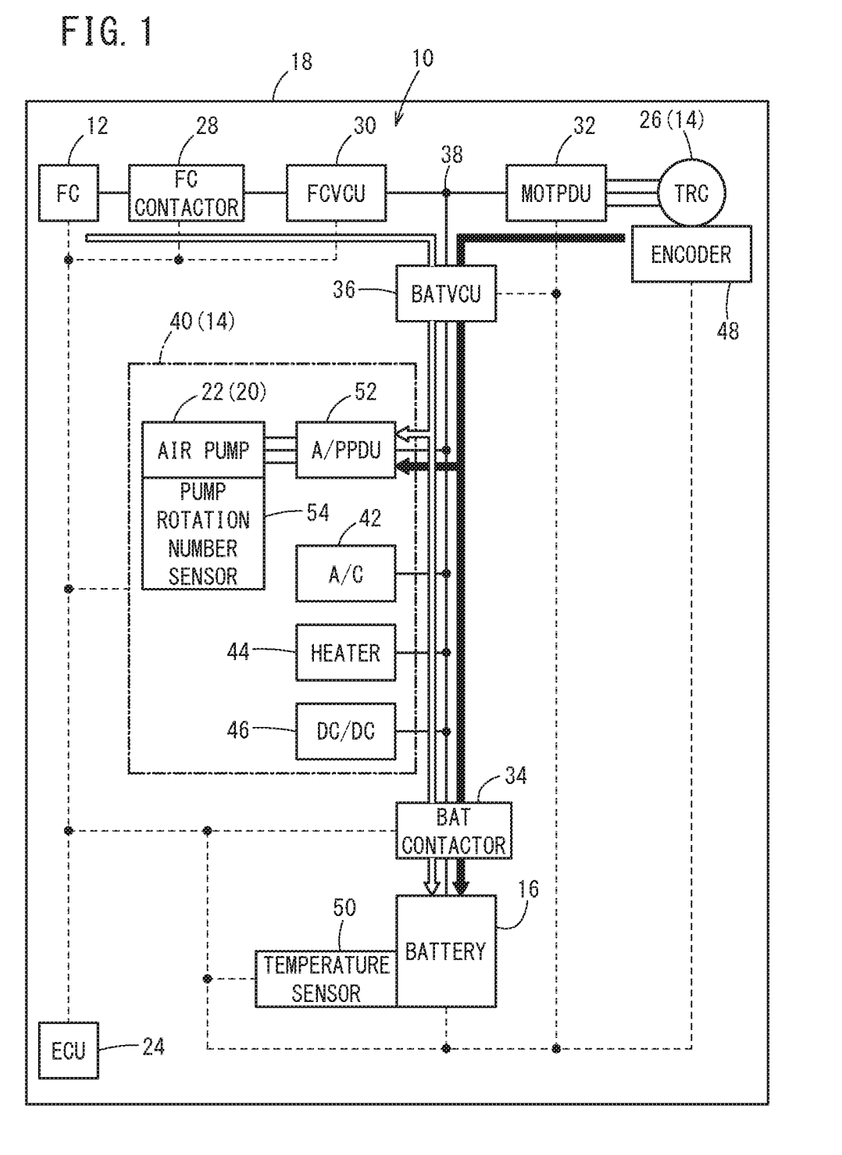
FIG. 1 is a block diagram showing overall structure of a fuel cell system according to one embodiment of the present invention.

A fuel cell system 10 according to an embodiment of the present invention in FIG. 1 is a system for supplying electrical energy using a fuel cell 12 (hereinafter also referred to as the FC 12). For example, electrical energy generated by power generation of the FC 12 is supplied to load(s) 14 and/or a battery 16 (energy storage), and regenerative electrical energy (regenerative power) of the load 14 is supplied to the battery 16. The fuel cell system 10 is mounted in a fuel cell vehicle 18 (hereinafter simply referred to as the vehicle 18).

The FC 12 of the fuel cell system 10 has stack structure. In the FC 12, reactions of hydrogen and oxygen are induced, and electrical energy produced in the reactions is output to the outside of the FC 12. To this end, the fuel cell system 10 includes a hydrogen gas supply apparatus (not shown) for supplying a hydrogen gas to the FC 12, and an oxygen-containing gas supply apparatus 20 for supplying the air as an oxygen-containing gas to the FC 12. The oxygen-containing gas supply apparatus 20 includes an oxygen-containing gas supply channel (not shown) and an air pump 22 provided in the middle of the oxygen-containing gas supply channel. The air is taken in from the outside of the vehicle 18, and supplied to the FC 12.

Further, the fuel cell system 10 includes an ECU 24 (control unit: Electronic Control Unit) for performing power management (energy management) of the vehicle 18. The ECU 24 is made up of a computer including a processor, a memory, and an input/output interface (not shown). The ECU 24 may include one ECU, or the ECU 24 may be in the form of a plurality of ECUs each having a dedicated function.

The fuel cell system 10 includes the FC 12 and a traction motor 26 (electric motor: hereinafter referred to as the TRC 26). The TRC 26 is the load 14. The FC 12 and the TRC 26 are connected electrically. An FC contactor 28, a step-up (voltage boost) converter 30 (referred to as the FCVCU 30), and an inverter 32 (referred to as the MOTPDU 32) are connected in series in this order between the FC 12 and the TRC 26.

Further, a battery 16 is connected to the TRC 26 through the BAT contactor 34 and a step-up/step-down (voltage boost/buck) converter 36 (also referred to as the BATVCU 36). The FCVUC 30 and the BATVCU 36 are connected to the TRC 26 in parallel, at a node 38 on the secondary side. Further, a plurality of auxiliary devices 40 as the loads 14 are connected in parallel to the primary side of the BATVCU 36. Examples of the auxiliary devices 40 include the air pump 22, an air conditioner 42 (referred to as the A/C 42), a heater 44, and a step-down (voltage buck) converter 46 (referred to as the DC/DC 46).

The FC contactor 28 is connected to the ECU 24. Under the control of the ECU 24, the FC contactor 28 connects or disconnects the FC 12 and the primary side of the FCVCU 30.

The FCVCU 30 is a voltage regulator (Voltage Control Unit) including a chopper circuit. The FCVCU 30 is connected to the ECU 24. The FCVCU 30 boosts the voltage on the primary side under the control of the ECU 24, and applies the resulting voltage to the secondary side.

The MOTPDU 32 is a three-phase bridge type. The MOTPDU 32 converts the DC voltage applied from the node 38 (FCVUC 30 and the BATVCU 36) into the AC voltage, and controls driving of the TRC 26 in correspondence with a control signal indicative of the target number of rotations output from the ECU 24. Further, the MOTPDU 32 functions as a converter for performing forward conversion during regeneration of the TRC 26, and converts the AC voltage produced in the TRC 26 into the DC voltage.

The TRC 26 is rotatably driven using the three-phase AC power of the MOTPDU 32, and the rotation force is transmitted to wheels through transmission, etc. (not shown) to move the vehicle 18. During deceleration of the vehicle 18, the TRC 26 functions as a power generator for outputting regenerative electrical energy to the battery 16 and/or the auxiliary devices 40. The TRC 26 is equipped with an encoder 48. The encoder 48 detects the number of rotations of the TRC 26, and outputs a rotation number signal to the ECU 24.

The battery 16 is chargeable with electrical energy, and electrical energy can be discharged from the battery 16. During power running, electrical energy is discharged from the battery 16, to compensate for the shortage in the power generation quantity of the FC 12 (quantity of electrical energy generated in the FC 12) with respect to the electrical energy actually consumed by the loads 14. During regeneration, the battery 16 is charged with redundant electrical energy which is electrical energy generated by the FC 12 and the loads 14 minus the electrical energy actually consumed by the loads 14. The SOC (state of charge) of the battery 16 is monitored by the ECU 24. A temperature sensor 50 is provided for the battery 16. The temperature sensor 50 detects the temperature state of the battery 16, and outputs data of the temperature state to the ECU 24.

The BAT contactor 34 is connected to the ECU 24, and connects or disconnects the battery 16 and the primary side of the BATVCU 36 under the control of the ECU 24.

As in the case of the FCVCU 30, the BATVCU 36 is in the form of a voltage regulator having a chopper circuit. The BATVCU 36 is connected to the ECU 24. Under control of the ECU 24, during power running, the BATVCU 36 boosts the voltage on the primary side and applies the resulting voltage to the secondary side whereas during regeneration, the BATVCU 36 bucks the secondary voltage and applies the resulting voltage to the primary side.

Among the auxiliary devices 40, the air pump 22 is connected to the primary side of the BATVCU 36 through the air pump PDU 52 (referred to as the A/PPDU 52). The A/PPDU 52 includes a three phase bridge type inverter. The A/PPDU 52 converts the DC voltage on the primary side into the AC voltage, and performs drive control of the air pump 22 in correspondence with a control signal indicative of the target number of rotations output from the ECU 24. Further, a pump rotation number sensor 54 detects the number of rotations of the air pump 22, and outputs a rotation number signal to the ECU 24.

The ECU 24 executes programs stored in the memory to control the entire operation of the fuel cell system 10. In this regard, the ECU 24 controls the BATVCU 36 in a manner that charging/discharging of the battery 16 does not exceed a charge/discharge limitation range 60 (see FIG. 3) which is described later. Further, the fuel cell system 10 according to the embodiment of the present invention determines margins 70 for the charge/discharge limitation range 60 of the battery 16 to ensure that charging/discharging of the battery 16 is performed within the charge/discharge limitation range 60.

Figure 2:
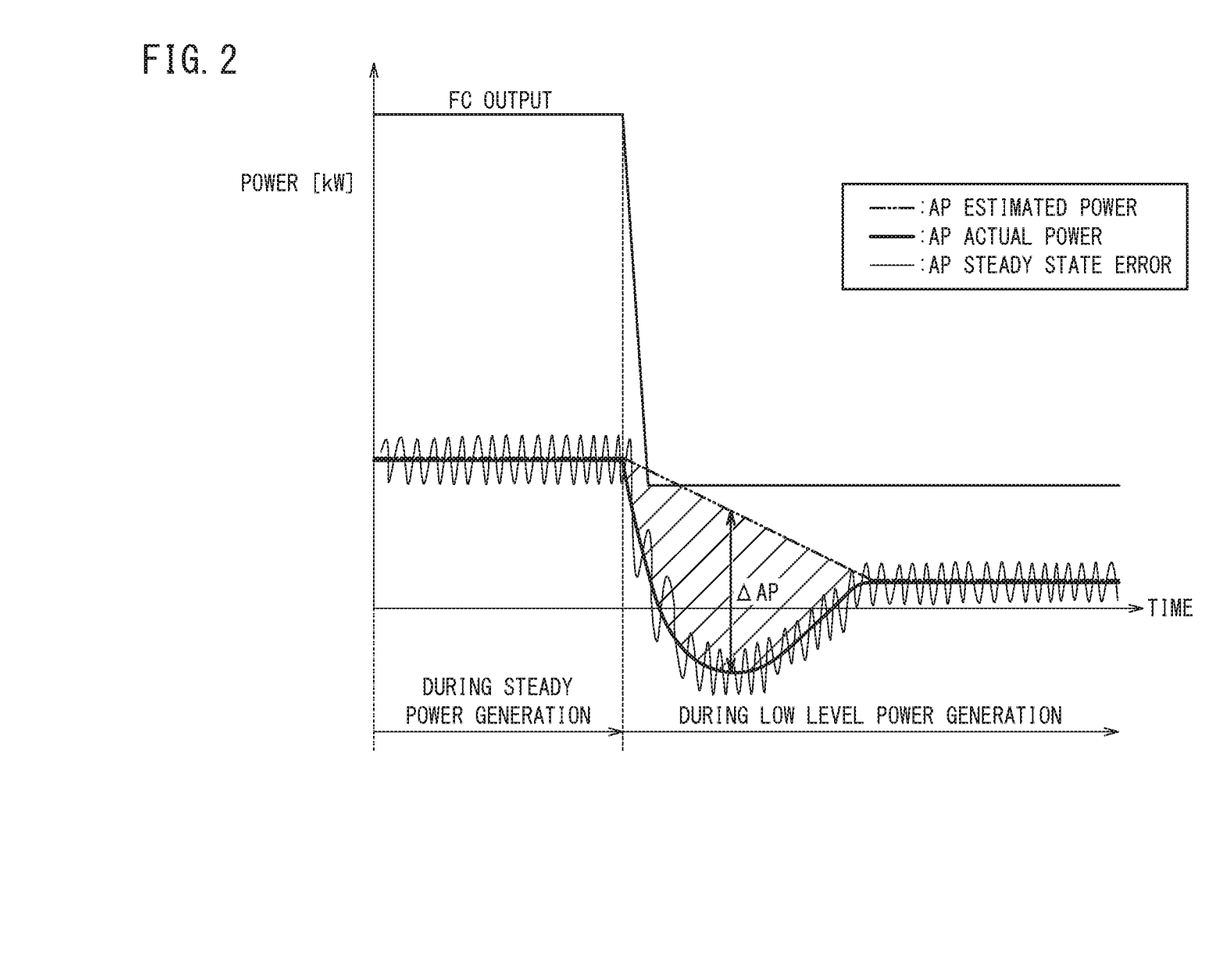
FIG. 2 is a graph showing the relationship between AP estimated power and AP actual power.

Hereinafter, the significance of the charge/discharge limitation range 60 and the margins 70 of the fuel cell system 10 will be described specifically. Basically, the fuel cell system 10 supplies electrical energy to the vehicle 18 (the auxiliary devices 40 including the TRC 26, the air pump 22, etc.) using the output of the FC 12. However, as shown in FIG. 2, during transitive variation of the supplied electrical energy and the consumed electrical energy, electrical energy generated in the FC 12 may become excessive or short (FIG. 2 shows the change of electrical energy of the air pump 22 when the output of the FC 12 is decreased). The battery 16 is charged with the redundant electrical energy and is discharged by releasing the excessive electrical energy under control of the ECU 24.

In the control of power management, the ECU 24 computes required power consumption which is electrical energy consumed by the entire vehicle 18, and computes the power generation quantity (target power) of the FC 12 in correspondence with the required power consumption. Further, in order to realize the pressure ratio (ratio between the air intake pressure of the air pump 22 and the air discharge pressure of the air pump 22) and the flow rate of the air in correspondence with the target electrical energy, the ECU 24 computes electrical energy required for the air pump 22 as well. This electrical energy is referred to as the "AP estimated power". For example, the AP estimated power is calculated by the ECU 24 from an electric power calculation map where the flow rate and the pressure ratio are input.

As shown by a two dot chain line in FIG. 2, during steady power generation where the FC 12 performs power generation to generate a stable quantity of electrical energy, the AP estimated power substantially matches the AP actual power (see a bold line in FIG. 2) which is electrical energy actually consumed by the air pump 22. The AP actual power is an effective value of electric power (alternating current) that oscillates within a minute time period at the air pump 22 (see AP steady state errors in FIG. 2).

Further, during low level power generation where the power generation quantity of the FC 12 is low, since the rotation speed of the air pump 22 is lowered beforehand, regenerative electrical energy (regenerative power) is obtained from the air pump 22. That is, the air pump 22 causes transitive operation where the AP actual power becomes smaller than the AP estimated power. The battery 16 can be charged with the regenerative power generated during the transitive operation. Conversely, in the case where the power generation quantity of the FC 12 is increased, since the rotation speed of the air pump 22 is increased beforehand, the AP actual power becomes larger than the AP estimated power of the air pump 22 (not shown in FIG. 2). In this specification, the difference between the AP actual power and the AP estimated power during the transitive operation of the air pump 22 as described above (=AP actual power−AP estimated power) is referred to as "ΔAP".

Then, during transitive variation where ΔAP has a large negative (−) value, the battery 16 is charged with redundant electrical energy of the FC 12 in addition to the regenerative electrical energy of the air pump 22. In contrast, during transitive variation where ΔAP has a large positive (+) value, electrical energy is discharged from the battery 16 as a result of increase in power consumption by the air pump 22 and shortage in the power generation quantity of the FC 12.

Figure 3:
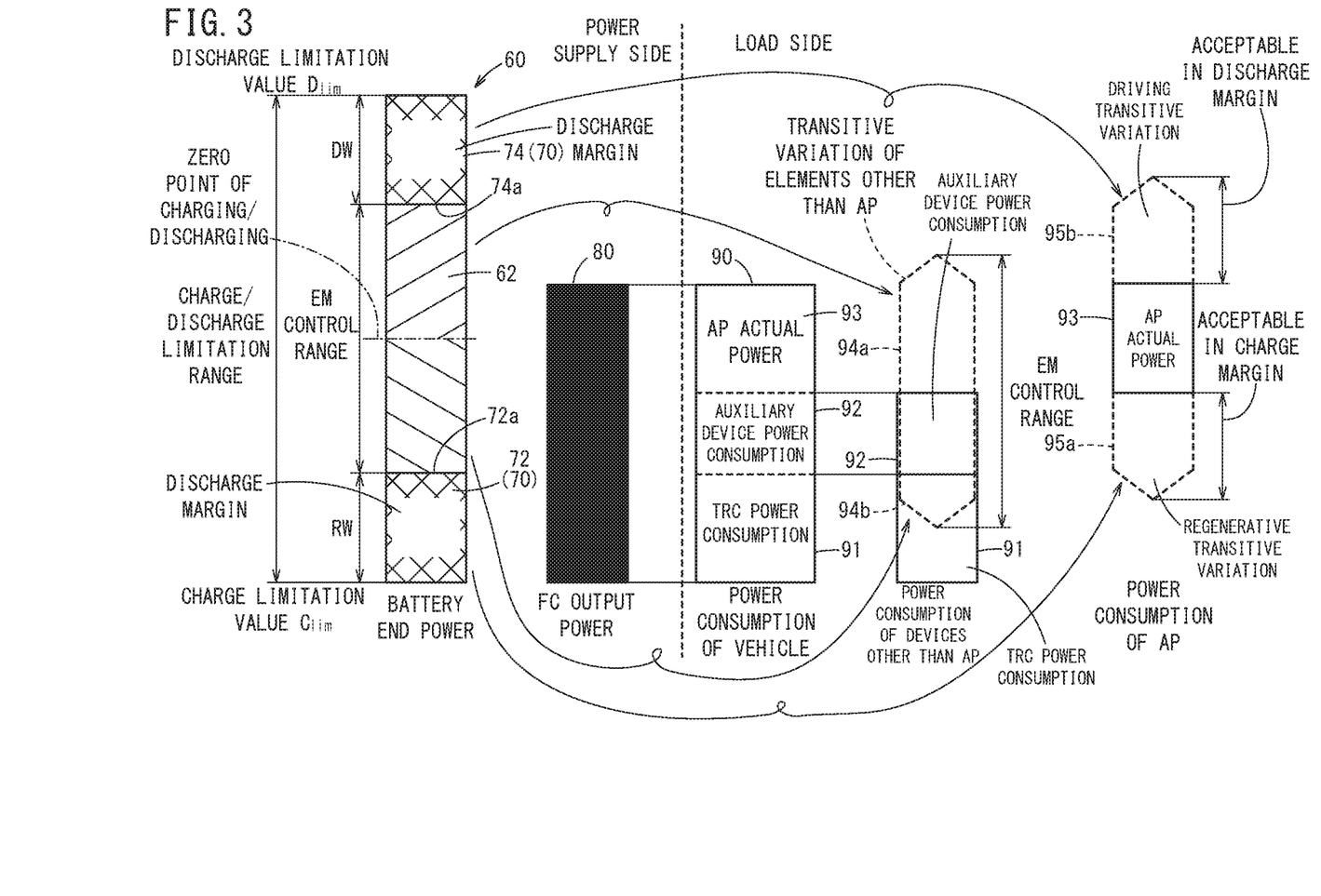
FIG. 3 is a view showing an example of allocation of electrical energy during normal traveling.

Further, as shown in FIG. 3, the battery 16 has a charge limitation value $C_{lim}$ which prohibits overcharging and a discharge limitation value $D_{lim}$ which prohibits overdischarging, based on the specification of the battery 16 (battery end power). The fuel cell system 10 prohibits the use of the battery 16 in excess of the charge limitation value $C_{lim}$ and the discharge limitation value $D_{lim}$. The fuel cell system 10 uses the battery 16 in the charge/discharge limitation range 60 between the charge limitation value $C_{lim}$ and the discharge limitation value $D_{lim}$.

In the charge/discharge limitation range 60, as the SOC of the battery 16 becomes large, the power width where the battery 16 can be discharged becomes large. As the SOC of the battery 16 becomes small, the power width where the battery 16 can be charged becomes large. FIG. 3 shows an example of power allocation when the SOC of the battery 16 is 50%. An intermediate point in the charge/discharge limitation range 60 is a zero point regarding the charging/discharging of the battery 16. Further, the charge/discharge limitation range 60 is determined in a manner that, when the temperature of the battery 16 is normal (e.g., not less than 0° C.), the overall power width becomes large, and when the temperature of the battery 16 is low (e.g., less than 0° C.), the overall power width becomes small.

In the fuel cell system 10 according to the embodiment of the present invention, the margins 70 are determined for the charge/discharge limitation range 60 of the battery 16 to prevent electrical energy of the battery 16 from reaching the charge/discharge limitation range 60. The margins 70 include a charge margin 72 placed before the charge limitation value $C_{lim}$ and a discharge margin 74 placed before the discharge limitation value $D_{lim}$.

For example, during normal traveling where acceleration/deceleration of the vehicle 18 is small, the charge margin 72 is the regenerative power width RW where ΔAP which is transitive variation of the regenerative (negative (−)) side of the air pump 22 does not exceed the regenerative power width RW, so as to absorb electrical energy regenerated by the air pump 22 (see also FIG. 2). Hereinafter, the charge margin 72 during normal traveling will also be referred to as the normal charge margin 72a. On the other hand, during normal traveling, it is determined that the discharge margin 74 is the drive power width DW where ΔAP which is transitive variation on the drive (positive (+)) side of the air pump 22 does not exceed the drive power width DW, so as to allow rapid consumption of electrical energy by the air pump 22. Hereinafter, the discharge margin 74 during normal traveling will also be referred to as the normal discharge margin 74a.

Stated otherwise, electrical energy of the margins 70 (the charge margin 72 and the discharge margin 74) is allocated for transitive variation of the air pump 22, and buffers unsteady changes (overshooting, etc.) of the AP actual power during regeneration and driving of the air pump 22, and prevents overcharging and overdischarging of the battery 16. On the other hand, electrical energy that falls out of the range of the charge margin 72 and the discharge margin 74 (hereinafter referred to as the EM control range 62) is allocated for the transitive variation of electrical energy consumed by the TRC 26 and the auxiliary devices 40 other than the air pump 22.

The ECU 24 of the fuel cell system 10 manages the charge margin 72, the discharge margin 74, and the EM control range 62, and controls charging/discharging of the battery 16. That is, during normal traveling of the vehicle 18, the ECU 24 computes the AP estimated power of the air pump 22 and the required power consumption of the vehicle 18. The electrical energy based on the AP estimated power and the required power consumption is satisfied by the electrical energy output from the FC 12 (power generation quantity) and the electrical energy discharged from the battery 16.

Specifically, the power consumption 90 as the electrical energy consumed by the vehicle 18 (the total power consumption of the TRC 26 (TRC power consumption 91), the power consumption of the auxiliary devices 40 other than the air pump 22 (auxiliary device power consumption 92), and the AP actual power 93 of the air pump 22) is equalized to the electrical energy (output power) 80 output from the FC 12.

Accordingly, the battery 16 is charged/discharged the quantity (assist quantity) of the transitive variation occurring when the state of the vehicle 18 is changed. For example, power on the discharge side of the EM control range 62 is used as the assist quantity in correspondence with the transitive variation 94a on the drive (positive) side of the TRC power consumption 91 and the auxiliary device power consumption 92 (i.e., power consumption of elements other than the air pump 22). On the other hand, power on the charging side in the EM control range 62 is used as the allowable charging quantity in correspondence with the transitive variation 94b on the regenerative (negative) side of the TRC power consumption 91 and the auxiliary device power consumption 92 (i.e., power consumption of elements other than the air pump 22). During traveling of the vehicle 18, the ECU 24 controls electrical energy for each of devices in a manner that the assist quantity of the battery 16 and the allowable charging quantity fall within the EM control range 62.

Further, during normal traveling of the vehicle 18, ΔAP as transitive variation of the air pump 22 is allowed due to the margins 70 of the battery 16. The charge margin 72 absorbs the regenerative transitive variation 95a (ΔAP having a negative (−) value) to prevent the charging quantity of the battery 16 from exceeding the charge limitation value $C_{lim}$. Conversely, the discharge margin 74 absorbs driving transitive variation 95b (ΔAP having a positive (+) value) to prevent the discharging quantity of the battery 16 from exceeding the discharge limitation value $D_{lim}$.

Figure 4:
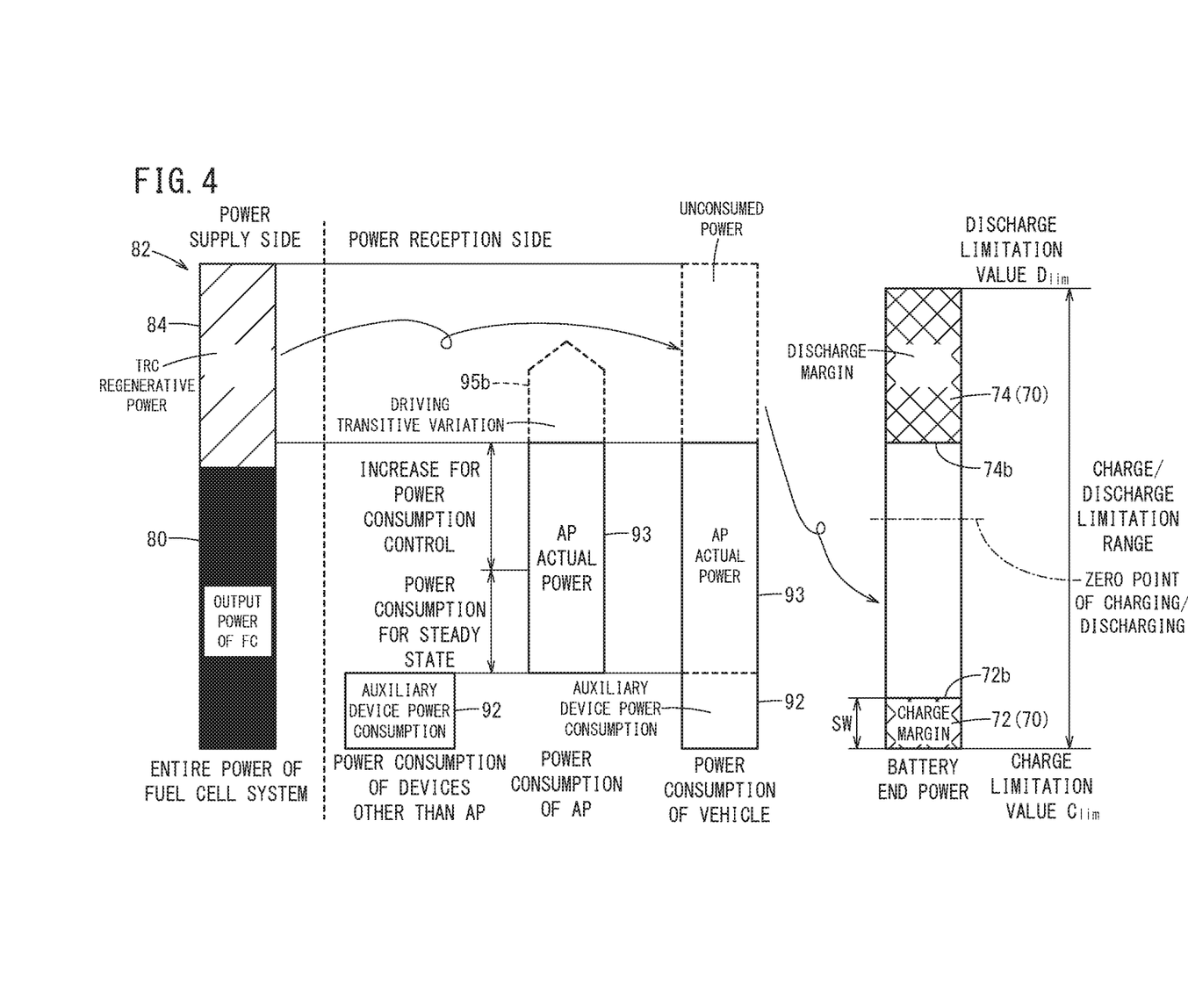
FIG. 4 is a view showing allocation of electrical energy during regeneration.

Further, as shown in FIG. 4, the fuel cell system 10 charges the battery 16 with electrical energy regenerated by the TRC 26 (TRC regenerative power 84) during deceleration, etc. while the vehicle 18 is traveling. That is, during deceleration of the vehicle 18, the TRC regenerative power 84 is added to the output power 80 output from the FC 12, and the resulting electrical energy is supplied to the battery 16 or the auxiliary devices 40. Therefore, the battery 16 is charged with a large quantity of electrical energy. Thus, during regeneration of the TRC 26, the fuel cell system 10 directs the electrical energy to the auxiliary devices 40 such as the air pump 22 as necessary, and performs power consumption control (power discarding control) to consume the redundant electrical energy.

In this power consumption control, the number of rotations of the air pump 22 is increased preferentially to consume electrical energy in the air pump 22. Further, in the power consumption control, when the quantity of the supplied air is increased by the air pump 22, the oxygen-containing gas supply apparatus 20 discharges the air through the oxygen-containing gas channel, instead of supplying the air to the FC 12.

The ECU 24 determines to perform the power consumption control, and suitably allocate the regenerative power 82 (the output power 80 and/or the TRC regenerative power 84) of the entire fuel cell system 10 to the battery 16 and the auxiliary devices 40. In particular, after the power consumption control is started, the ECU 24 reduces the charge margin 72 that was set (used) during normal traveling without the power consumption control. Hereinafter, control of setting or determining the charge margin 72 will be described.

As described above, the charge margin 72 of the battery 16 is determined to absorb ΔAP which is transitive variation on the regenerative (−) side of the air pump 22. Next, a case where the normal charge margin 72a in FIG. 3 continues to be set in the power consumption control as well will be considered. The power consumption control is a process performed during regeneration of the TRC 26 to suppress charging of the battery 16 and consume redundant electrical energy in the entire fuel cell system 10. Therefore, if the normal charge margin 72a has still been set during regeneration of the TRC 26, the electrical energy supposed to be given to the battery 16 is decreased by the quantity equal to the normal charge margin 72a and the quantity of electrical energy equal to the normal charge margin 72a is used in the power consumption control (consumed in the air pump 22).

On the other hand, the air pump 22 consumes electrical energy by increasing the rotation speed under the power consumption control. Therefore, regenerative electrical energy is not supplied from the air pump 22 to the battery 16. That is, even if the normal charge margin 72a has been set during the power generation control, this normal charge margin 72a is not used and moreover reduces regenerated power (unconsumed power) supplied from the TRC 26 to the battery 16.

Figure 5:
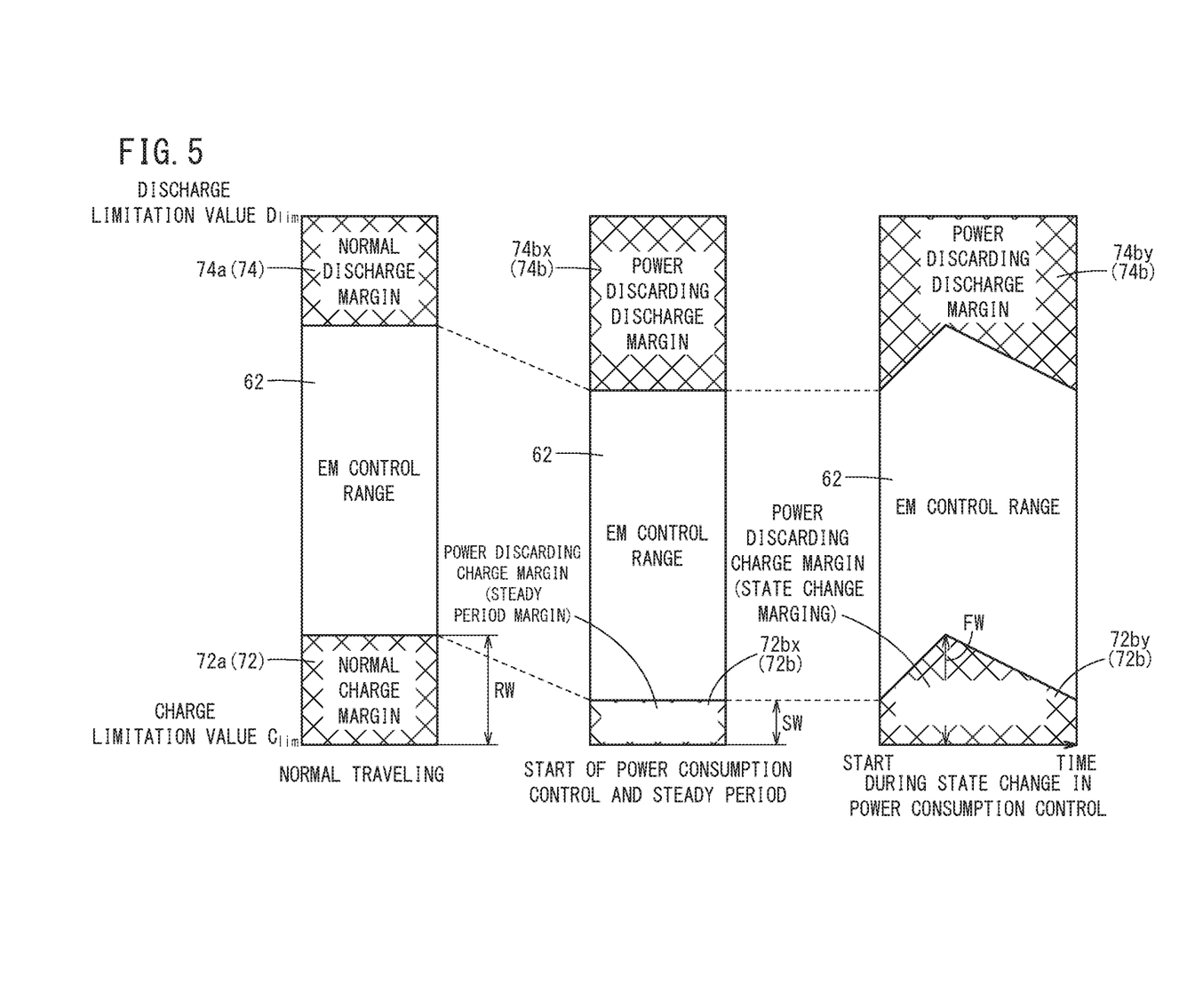
FIG. 5 is a view showing settings of margins.

For this reason, as shown in FIGS. 4 and 5, the fuel cell system 10 according to the embodiment of the present invention sets, for the power consumption control, a charge margin 72 (hereinafter referred to as the power discarding charge margin 72b) which is smaller than the normal charge margin 72a instead of the normal charge margin 72a. In this manner, during regeneration of the TRC 26, it is possible to increase the electrical energy supplied to the battery 16 and to charge the battery 16 more.

Specifically, the normal charge margin 72a is a regenerative power width RW which can absorb the regenerative power from the air pump 22. In contrast, the power discarding charge margin 72b is a steady power width SW which absorbs the minute time amplitude in steady operation of the air pump 22. The steady power width SW is an electrical energy quantity that is sufficiently (the degree to which the AC component that oscillates in the minute time is absorbed) smaller than the regenerative power width RW.

At the time of starting the power consumption control, the ECU 24 changes the setting of the charge margin from the normal charge margin 72a to the power discarding charge margin 72b described above for allowing the battery 16 to receive a large quantity of electrical energy during regeneration. It should be noted that, during the power consumption control, the ECU 24 may remove the power discarding charge margin 72b (steady power width SW) and allow the charging motor to perform regeneration until the charge limitation value $C_{lim}$ of the battery 16.

Further, during power consumption control, in response to a state change where the power discarding request of the fuel cell system 10 (regenerative power 82 of the system including the TRC regenerative power 84) changes, the fuel cell system 10 is configured to absorb overshooting during the change. Examples of the state change of the power consumption control where the regenerative power 82 is decreased include a case where deceleration is lessened when a user of the vehicle 18 accelerates softly during deceleration, a case where the vehicle 18 goes up a slope while acceleration/deceleration is kept constant.

Specifically, the power discarding charge margin 72b includes a steady period margin 72bx used after the start of the power consumption control and during the steady period, and a state change margin 72by used when the state change of the power consumption control occurs. The power width of the steady period margin 72bx is the above steady power width SW. For example, the state change margin 72by is calculated based on the regeneration signal value (accelerator degree of opening) and is a power width which is larger than the steady power width SW. Further, the state change margin 72by is a variation power width FW which gradually increases the power width over time from the start of the state change and thereafter, gradually decreases the power width. The turning time from the gradual increase to the gradual decrease is calculated as necessary based on the quantity of the state change (e.g., the change quantity of the TRC regenerative power 84). Further, it is preferable that the gradual increase period is shorter than the gradual decrease period.

During the state change where the regenerative power 82 changes, since the rotation speed of the air pump 22 changes as well, overshooting occurs as a result of the transitive variation. However, the ECU 24 applies the calculated state change margin 72by to absorb the temporal transitive variation of the air pump 22 with the state change margin 72by.

Thus, it is possible to prevent overcharging beyond the charge limitation value $C_{lim}$ of the battery 16.

Further, when the control proceeds from normal traveling to power consumption control, the ECU 24 should switch the discharge margin 74 in accordance with the charge margin 72. Specifically, the power width of the discharge margin 74 in the power consumption control (hereinafter referred to as the power discarding discharge margin 74b) is larger than the drive power width DW of the normal discharge margin 74a. For example, in the steady period of the power consumption control, the ECU 24 determines the positive (+) change width of the power discarding discharge margin 74b (steady period margin 74bx) in accordance with the negative (−) change width of the power discarding charge margin 72b so as not to change the power width of the EM control range 62.

In this manner, the responsiveness of the battery 16 to the air pump 22 (power discarding responsiveness) is improved, and it is possible to immediately discharge the battery 16, e.g., during transitive variation (driving transitive variation 95b) of the drive side of the air pump 22. During regeneration of the TRC 26, the state change where the regenerative power 82 is increased may occur when the user puts the brakes on, the vehicle 18 goes down a slope, and so on. During the state change, the power discarding discharge margin 74b sets the state change margin 74by where the power width is decreased gradually in accordance with the state change margin 72by of the power discarding charge margin 72b, and the power width is increased gradually after the elapse of the turning time. Therefore, also during transitive variation where the rotation speed of the air pump 22 is increased, it is possible to absorb unsteady operation of the air pump 22 with the power discarding charge margin 72b (state change margin 72by) and the power discarding discharge margin 74b (state change margin 74by) of the battery 16.

Figure 6:
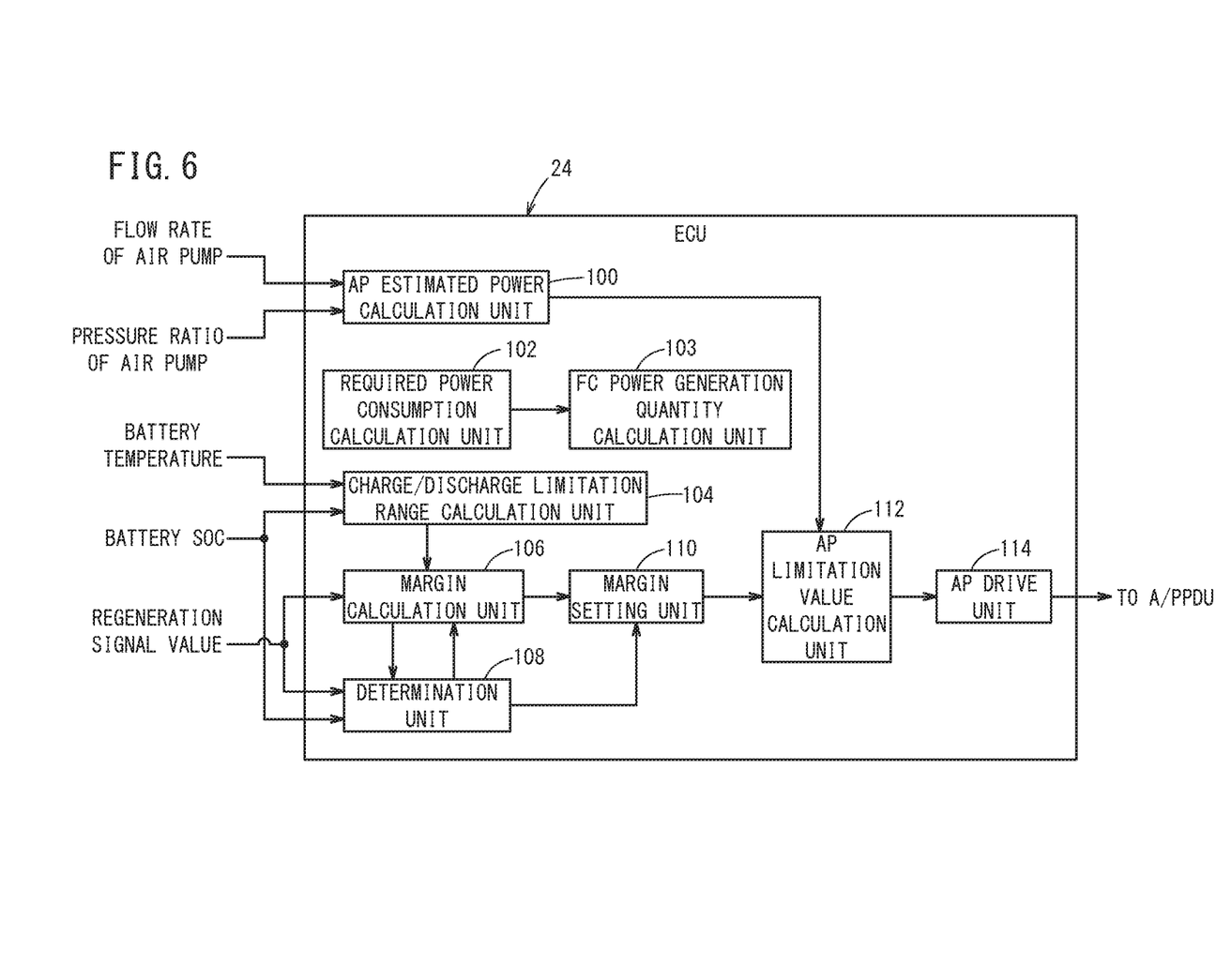
FIG. 6 is a block diagram showing a function unit in power management of an ECU.

In order to realize the above processes, as shown in FIG. 6, the ECU 24 includes an AP estimated power calculation unit 100, a required power consumption calculation unit 102, an FC power generation quantity calculation unit 103, a charge/discharge limitation range calculation unit 104, a margin calculation unit 106, a determination unit 108, a margin setting unit 110, an AP limitation value calculation unit 112, and an AP drive unit 114.

The AP estimated power calculation unit 100 calculates the AP estimated power of the air pump 22 based on the flow rate of the air pump 22 and the pressure ratio of the air pump 22. The required power consumption calculation unit 102 calculates power consumption required (required electrical energy consumed) in the fuel cell system 10. The FC power generation quantity calculation unit 103 calculates target electrical energy which is the power generation quantity of the FC 12, based on the calculated required power consumption. The charge/discharge limitation range calculation unit 104 calculates the charge limitation value $C_{lim}$ and the discharge limitation value $D_{lim}$ for limiting battery end power, based on the SOC and the temperature of the battery 16.

Further, the margin calculation unit 106 calculates the margins 70 (the charge margin 72 and the discharge margin 74) of the air pump 22 using the charge limitation value $C_{lim}$ and the discharge limitation value $D_{lim}$ calculated by the charge/discharge limitation range calculation unit 104. In calculating the margins 70, for example, margins corresponding to the charge limitation value $C_{lim}$ and the discharge limitation value $D_{lim}$ are extracted from a correspondence map (not shown) stored in a memory beforehand.

Then, firstly, as basic margins, the normal charge margin 72a and the normal discharge margin 74a for normal traveling are determined.

Further, in the case where the determination unit 108 described later determined to perform power consumption control, the margin calculation unit 106 calculates the power discarding charge margin 72b and the power discarding discharge margin 74b again. As described above, the power discarding charge margin 72b includes the state change margin 72by corresponding to the state change during power consumption control, in addition to the steady period margin 72bx of the steady power width SW. Therefore, the margin calculation unit 106 monitors a regeneration signal value (accelerator degree of opening of an accelerator degree-of-opening sensor (not shown)) input to the ECU 24 and a timer in the ECU 24, and calculates the steady period margin 72bx or the state change margin 72by. Further, at this time, the margin calculation unit 106 calculates the discharge margin 74 in association with the charge margin 72.

The determination unit 108 determines whether or not power consumption control should be performed during regeneration of the TRC 26 based on the regeneration signal value transmitted from the vehicle 18, the SOC of the battery 16, and so on. For example, in the case where the user of the vehicle 18 performed deceleration operation and the regeneration signal value became not more than a predetermined value, and the SOC of the battery 16 is large, the determination unit 108 determines to perform power consumption control of the battery 16.

The margin setting unit 110 determines the currently appropriate margins 70 based on the determination result of the determination unit 108. That is, in the case where the power consumption control is not performed, the normal charge margin 72a and the normal discharge margins 74a (the basic margins 70) are set. On the other hand, in the case of performing power consumption control, the power discarding charge margin 72b (steady period margin 72bx, state change margin 72by) and the power discarding discharge margin 74b (steady period margin 74bx, state change margin 74by) are set.

Figure 8:
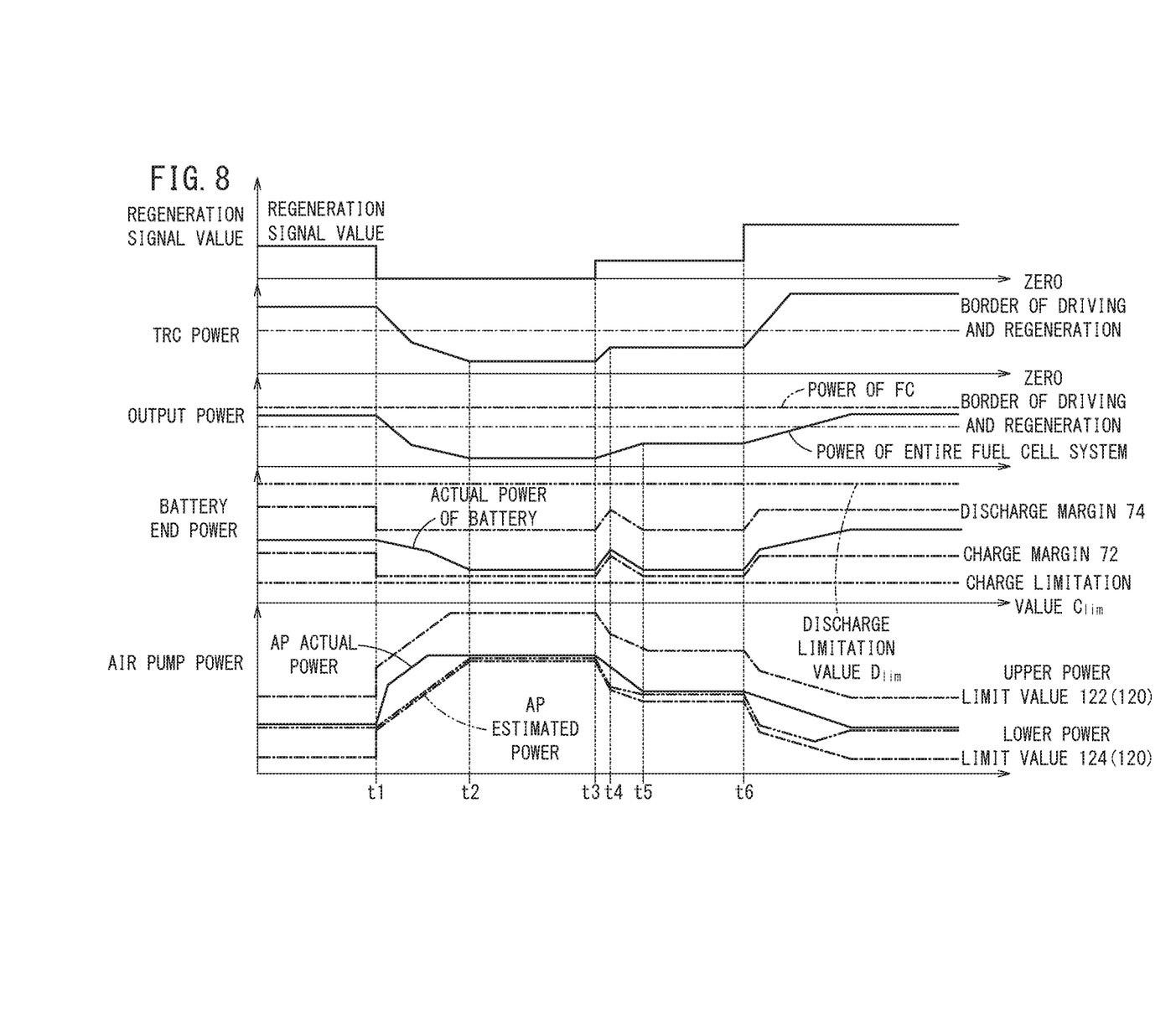
FIG. 8 is a time chart showing the change in electrical energy during regeneration.

The AP limitation value calculation unit 112 calculates the AP power limit 120 of the air pump 22 based on the margins 70 determined by the margin setting unit 110 and the AP estimated power calculated by the AP estimated power calculation unit 100 (see FIG. 8). The AP power limit 120 is used to limit the AP actual power at the time of driving the air pump 22. The AP power limit 120 includes an upper power limit value 122 and a lower power limit value 124.

The AP drive unit 114 calculates the AP actual power in a manner that the AP actual power falls within the range of the AP power limit 120 (the upper power limit value 122 and the lower power limit value 124) based on a rotation speed command calculated by a power generation control unit (not shown) of the FC 12. Further, the control signal in correspondence with the calculation result is output to the A/PPDU 52, and the air pump 22 is driven and rotated.

The fuel cell system 10 according to the embodiment of the present invention basically has the above structure. Next, working effects and advantages of the fuel cell system 10 will be described.

The ECU 24 of the fuel cell system 10 performs the control process of power management when the vehicle 18 is in operation. Specifically, the AP estimated power calculation unit 100, the required power consumption calculation unit 102, and the charging/discharging limit range calculation unit 104 calculate the AP estimated power, the required power consumption, and the charge limitation value $C_{lim}$ and the discharge limitation value $D_{lim}$ of the battery 16, respectively. Further, the FC power generation quantity calculation unit 103 of the ECU 24 calculates the power generation quantity of the FC 12 based on the calculated required power consumption. Further, the ECU 24 performs the process flow shown in FIG. 7 at the time of determining the margins 70 of the battery 16.

Figure 7:
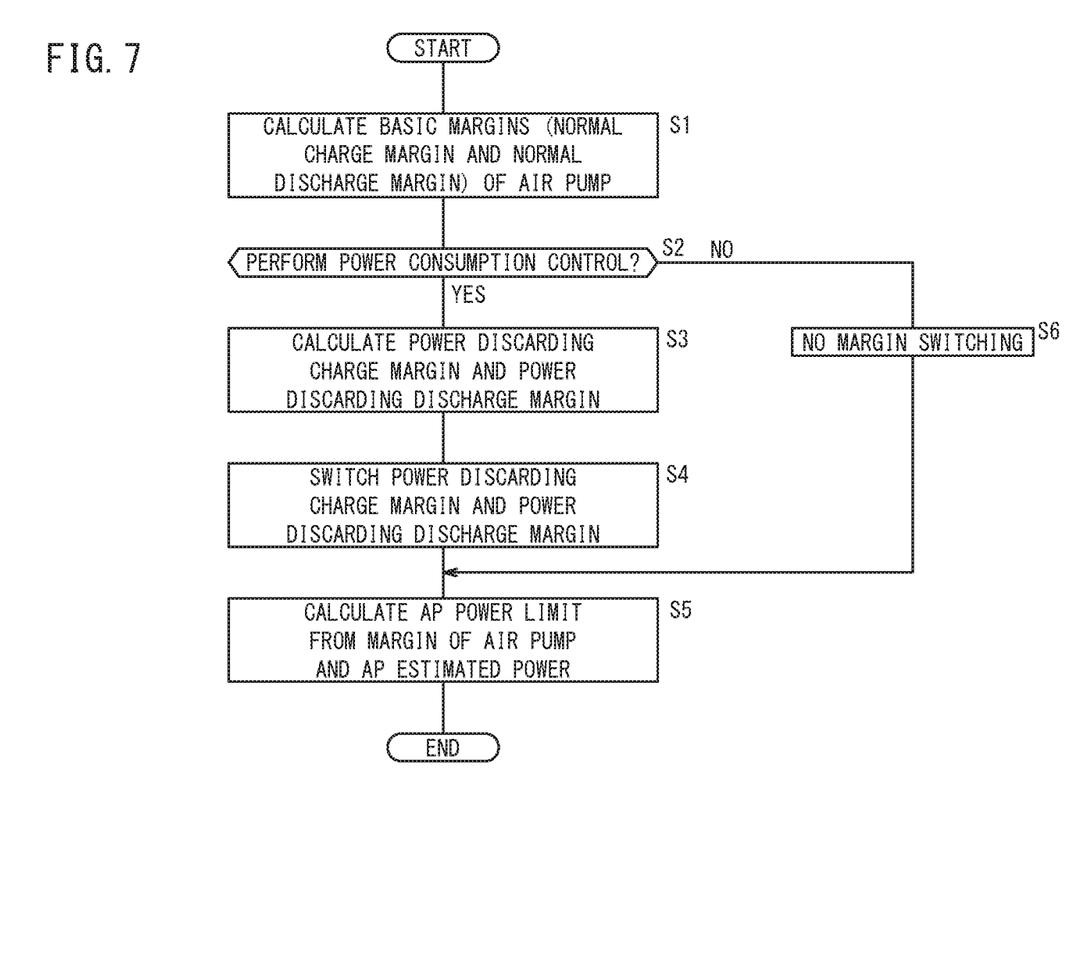
FIG. 7 is a flow chart showing processes at the time of determining the margins in the fuel cell system.

In this case, firstly, the margin calculation unit 106 of the ECU 24 calculates the basic margins 70 in correspondence with the charge limitation value $C_{lim}$ and the discharge limitation value $D_{lim}$ (step S1). That is, the fuel cell system 10 calculates the normal charge margin 72a and the normal discharge margin 74a which are based on the normal traveling of the vehicle 18 and capable of absorbing ΔAP in transitive variation during regeneration and driving of the air pump 22.

Next, the determination unit 108 of the ECU 24 determines whether or not the power consumption control should be performed, e.g., based on the SOC of the battery 16 or the regeneration signal value transmitted to the ECU 24 (step S2). For example, in the case where the regeneration signal value is large, since the regenerative power of the TRC 26 is large, the power consumption control is performed. In performing the power consumption control, the fuel cell system 10 drives the air pump 22 most preferentially, and consumes a large quantity of electrical energy in the air pump 22.

If the determination unit 108 determines to perform power consumption control (step S2: YES), the margin calculation unit 106 of the ECU 24 calculates the power discarding charge margin 72b (and the power discarding discharge margin 74b) for the power consumption control (step S3). As described above, power discarding charge margin 72b includes the steady period margin 72bx and the state change margin 72by. The fuel cell system 10 changes the power width of the margins 70 in correspondence with the change in the regeneration signal value. Therefore, in the power consumption control, by calculating the power discarding charge margin 72b and the power discarding discharge margin 74b with the margin calculation unit 106 each time the process flow is performed, it is possible to obtain the margins 70 where the power width changes suitably on the time axis.

After step S3, the margin setting unit 110 of the ECU 24 performs switching from the normal charge margin 72a and the normal discharge margin 74a into the calculated power discarding charge margin 72b and power discarding discharge margin 74b (step S4). Further, after the switching process, the power discarding charge margin 72b and the power discarding discharge margin 74b are output to the AP limitation value calculation unit 112.

The AP limitation value calculation unit 112 calculates the AP power limit 120 of the air pump 22 (the upper power limit value 122 and the lower power limit value 124) based on the margins 70 determined by the margin setting unit 110 and on the AP estimated power which has been calculated beforehand (step S5). That is, in the case where the power discarding charge margin 72b is set, the AP limitation value calculation unit 112 calculates the AP power limit 120 which gradually increases the upper power limit value 122 and the lower power limit value 124 in correspondence with the power discarding charge margin 72b. Then, the AP drive unit 114 controls (increases) the rotation speed of the air pump 22 within the range of the calculated AP power limit 120.

Further, in step S2, if the determination unit 108 determines not to perform the power generation consumption control (step S2: NO), the margin setting unit 110 sets the normal charge margin 72a and normal discharge margin 74a which have already been calculated, without switching the margins 70 (step S6). Then, if the normal charge margin 72a is set, in step S5, the AP limitation value calculation unit 112 calculates the AP power limit 120 in correspondence with the normal charge margin 72a. Then, the AP drive unit 114 controls the rotation speed of the air pump 22 within the range of the calculated AP power limit 120 (to become substantially constant in correspondence with the power generation quantity of the FC 12).

As described above, the ECU 24 according to the embodiment of the present invention performs switching of the margins 70 of the battery 16 which are set during normal traveling, at the time of performing the power consumption control. Next, for further understanding of the present invention, an example of the changes in electrical energy in the power consumption control in the fuel cell system 10 will be described with reference to a time chart in FIG. 8. It should be noted that this time chart is on the premise that the FC 12 continuously generates a predetermined quantity of electrical energy, and the SOC of the battery 16 is about 50%.

The vehicle 18 travels normally until the time point t1 in FIG. 8 based on the user's acceleration operation (the accelerator degree of opening is kept constant at an arbitrary level). Therefore, the TRC 26 is driven and rotated by consuming electrical energy in correspondence with the accelerator degree of opening. At this time, the regeneration signal value is zero. That is, electric power is output from the fuel cell system 10 (in FIG. 8, the electric power of the entire fuel cell system 10 is on the drive side above the zero border). Further, the auxiliary devices 40, etc. in operation are consuming electrical energy.

In the period until the time point t1, the ECU 24 sets the margin 70 for the normal traveling, in the process flow described above. That is, the normal charge margin 72a is determined (set) for the charge limitation value $C_{lim}$, and the normal discharge margin 74a is determined (set) for the discharge limitation value $D_{lim}$. Thus, the battery 16 absorbs ΔAP which is transitive variation of the air pump 22. Further, the ECU 24 (AP limitation value calculation unit 112) calculates the AP power limit 120 from the normal charge margin 72a and the AP estimated power, and performs drive control of the air pump 22. Therefore, the air pump 22 is driven by the AP actual power approximately equal to the AP estimated power.

Then, at the time point t1, when the accelerator degree of opening becomes zero under the user's operation, the vehicle 18 starts deceleration. At this time, the TRC 26 is driven as a power generator to generate TRC regenerative power 84, and supplies the TRC regenerative power 84 to the fuel cell system 10. That is, the TRC 26 is switched from power consumption (driving) to the power supply source (regeneration), and the entire system is switched from the state of outputting electrical energy to the state of receiving electrical energy (the power of the entire system is placed on the regenerative side below the zero border).

When the ECU 24 determines to perform the power consumption control during the regeneration, the ECU 24 calculates the power discarding charge margin 72b (steady period margin 72bx), and changes the setting of the margins 70 from the normal charge margin 72a to the power discarding charge margin 72b. Likewise, the ECU 24 changes the setting of the margins 70 from the normal discharge margin 74a to the power discarding discharge margin 74b. Thus, the regenerative power 82 of the TRC 26 during regeneration is directed to the battery 16 and the air pump 22. Further, using the power discarding charge margin 72b, a quantity of electrical energy which is larger than electrical energy for normal traveling is supplied to the battery 16.

Further, during power consumption control, the ECU 24 calculates the AP power target value in correspondence with the accelerator degree of opening (regeneration signal value), and increases the rotation speed of the air pump 22 to control the AP estimated power toward the AP power target value. At this time, since the rotation speed of the air pump 22 is not increased immediately, the AP estimated power is calculated increasing gradually between the time point t1 and the time point t2. Further, the ECU 24 calculates the AP power limit 120 (the upper power limit value 122 and the lower power limit value 124) based on the power discarding charge margin 72b and the AP estimated power, and increases the rotation speed of the air pump 22 within the AP power limit 120 to consume electrical energy during the power consumption control. It should be noted that, in the period between the time point t1 and the time point t2 at the time of starting power consumption control, the AP actual power of the air pump 22 becomes larger than the AP estimated power due to transitive variation. Therefore, the electrical energy discharged from the battery 16 decreases gradually in comparison with the electrical energy received in the entire system.

In this regard, at the time point t3 during the power consumption control, it is assumed that, by the user's acceleration operation, the accelerator degree of opening is increased slightly (regeneration signal value is decreased), and the regenerative power of the TRC 26 is decreased. When the ECU 24 receives the regeneration signal value indicative of this state change, the ECU 24 calculates and determines the state change margins 72by, 74by based on the regeneration signal value (see also FIG. 5). As a result, during the period from the time point t3 to the time point t4, the power width of the power discarding charge margin 72b is increased gradually, and the power width of the power discarding discharge margin 74b is decreased gradually. Therefore, the AP power limit 120 of the air pump 22 changes gradually.

Then, the air pump 22 decreases the rotation speed (power consumption quantity) based on the state change where the regeneration signal value is decreased. However, overshooting, where the AP actual power goes below the AP estimated power, due to transitive variation is suppressed by decreasing the AP power limit 120 of the air pump 22 gradually. Further, during the state change, since the power discarding charge margin 72b becomes large, the overcharging state where the battery 16 is charged with large electrical energy instantaneously is suppressed even if the overshooting is occurring to some extent.

After the time point t4, since overshooting starts to converge, the ECU 24 gradually changes the state change margin 72by to the steady period margin 72bxby the time point t5. Thus, the degree of decrease of the AP power limit 120 changes gradually. After the time point t5, the steady period margins 72bx, 74bx are applied again.

Thereafter, at the time point t6, when the accelerator degree of opening is increased significantly by the user's acceleration operation, the TRC 26 is driven and rotated and makes the transition from the state of regenerating electrical energy to the state of consuming electrical energy by being driven and rotated. Accordingly, the electrical energy of the entire fuel cell system 10 is switched from the state of receiving electrical energy to the state of outputting electrical energy.

When the ECU 24 is switched from power consumption control to the normal traveling, the margins 70 of the battery 16 are switched from the steady period margins 72*bx*, 74*bx* to the state change margins 72*by*, 74*by*, and restored to the normal charge margin 72*a* (and the normal discharge margin 74*a*). As a result, the AP power limit 120 of the air pump 22 is calculated in a manner that the AP power limit 120 changes gradually, and it is possible to suppress the situation where the AP actual power becomes lower than the lower power limit value 124, i.e., it is possible to suppress the situation where inrush power of the air pump 22 is supplied to the battery 16.

As described above, the fuel cell system 10 according to the embodiment of the present invention offers the following advantages.

In the fuel cell system 10, with the simple structure where the power discarding charge margin 72*b* after starting the power consumption control is smaller than the normal charge margin 72*a* before performing the power consumption control, it is possible to protect the battery 16 from the overcharging state with the minimum necessary power consumption during regeneration of the TRC 26. Further, the oxygen-containing gas supply apparatus 20 (air pump 22) reduces electrical energy consumed during the power consumption control, and it becomes possible to suppress overheating of the oxygen-containing gas supply apparatus 20. That is, it is possible to effectively utilize the electrical energy of the entire fuel cell system 10, and realize stable driving of the fuel cell system 10.

Further, during the state change where the regenerative power of the fuel cell system 10 changes, the fuel cell system 10 makes the power discarding charge margin 72*b* (state change margin 72*by*) larger than the power discarding charge margin 72*b* (steady period margin 72*bx*) that is set after the power consumption control starts. Thus, it is possible to suppress the overcharging state where the battery 16 is charged with large electrical energy instantaneously.

Further, during the power consumption control, the fuel cell system 10 sets the steady power width SW in correspondence with the steady operation of the oxygen-containing gas supply apparatus 20 (air pump 22). Therefore, the power discarding charge margin 72*b* (steady period margin 72*bx*) can be reduced sufficiently, and the power change during the steady operation of the oxygen-containing gas supply apparatus 20 becomes acceptable. Further, during the state change, the power discarding charge margin 72*b* is changed to the power width in correspondence with the responsiveness during transitive operation where the driving state of the oxygen-containing gas supply apparatus 20 changes. In this manner, it is possible to achieve both of protection of the battery 16 against the overcharging state and suppression of overheating of the oxygen-containing gas supply apparatus 20 in an optimal way.

Further, the fuel cell system 10 is mounted in the fuel cell vehicle 18. Therefore, it is possible to increase the efficiency in the use of electrical energy at the time of driving the fuel cell vehicle 18.

The present invention is not limited to the above described embodiment. Various modifications can be made in line with the gist of the present invention. For example, in the fuel cell system 10, during regeneration of the TRC 26, the redundant electrical energy for charging the battery 16 is supplied preferentially to the air pump 22 to consume electrical energy. Alternatively, electrical energy may be supplied to the loads 14 other than the air pump 22 to consume electrical energy. Also in this case, the normal charge margin 72*a* which is used during the normal traveling is switched to the power discarding charge margin 72*b* during the power consumption control. In this manner, it is possible to protect the overcharging state of the battery 16.

What is claimed is:

1. A fuel cell system comprising:
a fuel cell;
an electric motor configured to be driven and rotated when electrical energy is supplied to the electric motor and configured to regenerate electrical energy as the electric motor is rotated;
an oxygen-containing gas supply apparatus configured to supply an oxygen-containing gas to the fuel cell;
an energy storage capable of being charged and discharged, the energy storage being connected electrically to the fuel cell, the electric motor, and the oxygen-containing gas supply apparatus; and
a control unit configured to perform power consumption control for controlling allocation of electrical energy for the electric motor, the oxygen-containing gas supply apparatus, and the energy storage, and allowing the oxygen-containing gas supply apparatus to consume electrical energy generated during regeneration of the electric motor,
wherein the control unit is configured to determine a charge margin with respect to a charge limitation value of the energy storage, in a manner that the charge margin set after the power consumption control starts is smaller than the charge margin set before the power consumption control is performed.

2. The fuel cell system according to claim 1, wherein during a state change where electrical energy during the regeneration of the fuel cell system changes in the power consumption control, the control unit is configured to make the charge margin become larger than the charge margin set after the power consumption control starts.

3. The fuel cell system according to claim 2, wherein the control unit is configured to determine that the charge margin set after the power consumption control starts has a power width in correspondence with steady operation of the oxygen-containing gas supply apparatus; and
the control unit is configured to change the charge margin during the state change to have a power width in correspondence with responsiveness during transitive operation where a drive state of the oxygen-containing gas supply apparatus changes when the power consumption control is not performed.

4. The fuel cell system according to claim 1, wherein the fuel cell system is mounted in a fuel cell vehicle.

* * * * *